March 10, 1931.  J. LINDER  1,795,725
FOOT ACCELERATOR
Filed Nov. 26, 1928
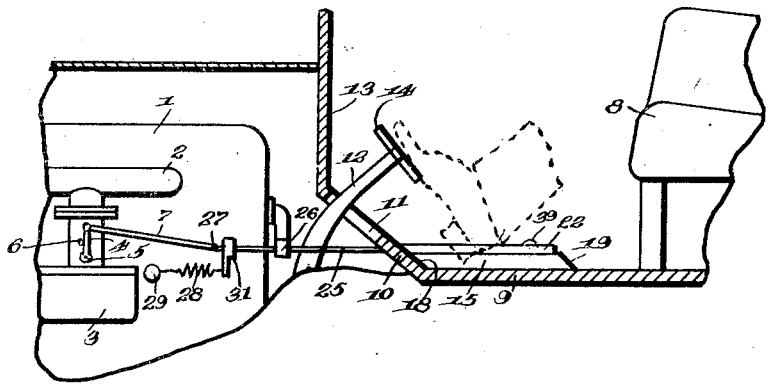
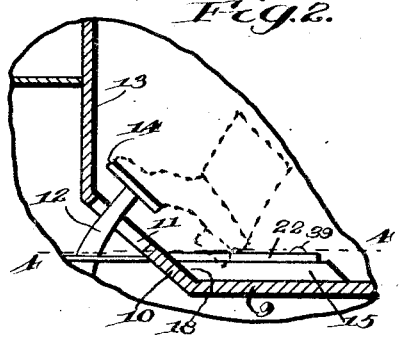
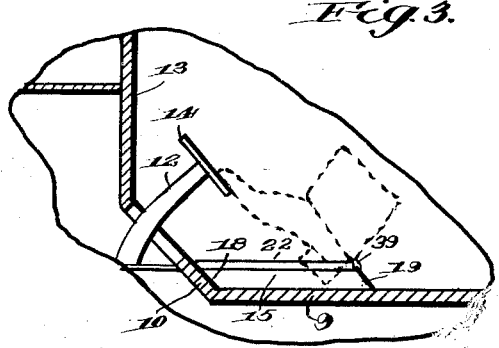
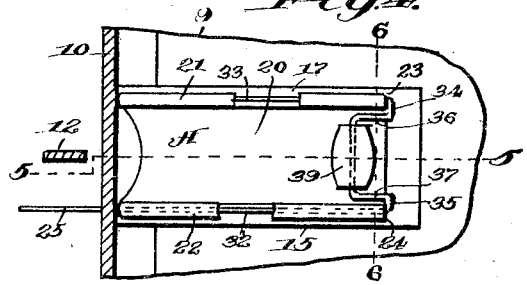
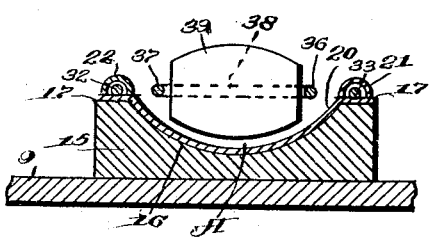
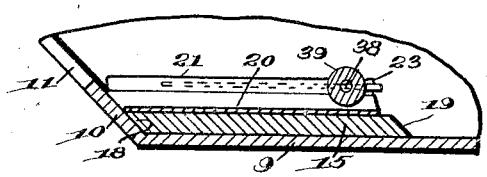
INVENTOR
John Linder
BY
Carl H. Crawford
ATTORNEY Patented Mar. 10, 1931

1,795,725

UNITED STATES PATENT OFFICE

JOHN LINDER, OF SPOKANE, WASHINGTON

FOOT ACCELERATOR

Application filed November 26, 1928. Serial No. 322,030.

The object of this invention is to provide an improved accelerator for automobiles.

One of the features of the invention is to provide a foot controlled accelerator in such relation to the brake treadle lever that the driver will not have to shift his foot laterally to operate one, after releasing the other.

It is a feature of the invention to provide a foot controlled accelerator in such relation to the brake treadle that movement of the foot of the driver in operating either, will take place in a given plane, preferably in the swinging plane of the brake treadle, and wherein the driver's foot will be merely shifted forwardly and backwardly into operative relation with either the brake treadle or the accelerator.

One of the features of the invention takes the form of a heel guide in which the heel of the driver's shoe is normally disposed and which functions to guide the driver's foot into operative relation with either the accelerator or the brake treadle.

The invention has many other features and objects which will be more fully described in connection with the accompanying drawing and which will be more particularly pointed out in and by the appended claims.

In the drawing:—

Fig. 1 is a vertical sectional view, partly in elevation, of a portion of an automobile showing how the device of my invention is applied thereto and showing the driver's foot in position to operate the brake treadle.

Fig. 2, is a similar view of a portion of the device shown in Fig. 1, illustrating the brake treadle depressed.

Fig. 3, is a similar view showing how the driver's foot may be retracted on the brake treadle without dis-engagement therefrom and showing how the heel of the shoe has actuated the accelerator.

Fig. 4 is an enlarged view taken on line 4—4 of Fig. 2, and showing the device in plan.

Fig. 5, is a sectional view on line 5—5 of Fig. 4.

Fig. 6, is a cross sectional view taken on line 6—6 of Fig. 4, looking to the left, and showing the heel guide on an enlarged scale.

Like characters of reference designate similar parts throughout the different figures of the drawing.

In the form shown, I have illustrated a portion of an automobile in which the engine is designated at 1, the intake manifold at 2 and the carbureter at 3. A throttle actuating arm for the valve (not shown) of the carbureter 3, is indicated at 4, and is mounted on an oscillatory shaft 5, in the usual way. I have shown a stop 6 for limiting movement of said arm 4, at a valve closing position. A rod 7 has one end pivoted to said arm 4, as clearly shown.

The driver's seat is indicated at 8 and the foot board at 9. That portion of the board which is inclined, as shown at 10, will be termed the toe board and has the usual slot 11, through which the brake treadle lever 12, projects, the dash being indicated at 13. On the lever 12, is the usual foot or toe plate 14 by means of which the toe portion of the driver's shoe may be applied to depress said lever. It will be clear that the engine is at the front or forward portion of the car and that the plane in which the lever 12 swings is parallel with the longitudinal axis of the car and as the brake lever 12, is depressed in a general forward direction and retracted in a general rearward direction, it will be understood throughout the specification and the claims that a forward direction means toward the engine and a rearward direction means away from the engine.

Reference will next be made to features of my invention which coact in interdependent combination with what has been disclosed.

I will consider the toe board 10 and the foot board 9, broadly, as the "foot board structure" but it is a feature of my invention, specifically, to mount one of the elements of the device on the foot board although this is not an absolutely essential mounting. However, what I will term my heel guide device is designated at 15 and the same may be an elongated block mounted rigidly upon the foot board 9 with its longitudinal central axis in the same plane in which the lever 12 swings. Said guide block is preferably of a height to slightly elevate the upper face thereof above the foot board 9, and said upper face is concave transversely of the length of said block as indicated at 16, in Fig. 6, leaving laterally disposed shoulders 17, extending lengthwise of said block. The forward edge may be chamfered, as indicated at 18, to fit flush against the adjacent face of the toe board 10. The rear end 19 may also be inclined as shown. I preferably face the top of said block with a suitable metal covering 20 to take the wear incident to continuous use although of course the whole structure may be of metal or other suitable material if desired, without departing from the spirit of my invention. Laterally of the heel guide channel, the metal is suitably formed to provide guideways 21 and 22, which, in the present construction are in the form of sleeve guides. The rear ends 23 and 24, of said sleeve guides, as will presently appear, form stops.

It will now be clear that the heel guide device is not only located in alinement with the swinging plane of the brake treadle lever 12, but also in subjacent relation thereto, or rather to the toe plate 14, thereof. It will be further understood that said heel guide device extends rearwardly from said lever 12.

My invention includes a throttle actuating member that is slidably disposed in said heel guide device and in the present construction, said actuating member is in the form of a rod 25 which extends through the foot board structure and may be journalled in a guide 26, suitably mounted. The forward end of said rod 25 is pivoted to connecting rod 7, at 27. A spring 28, which is contractile, has one end secured at 29, to a suitable stationary part, and the remaining end is secured at 30, to an arm 31, mounted on rod 25. Thus, this spring 28 normally acts to close the throttle of the carbureter, and opening movement of the latter is against the action of said spring. Said rod 25, is slidably disposed in sleeve 22 and I will term that portion of said rod the actuating limb 32. The rod is bent U-shaped, as shown, to form a remaining or idle limb 33 which is bent parallel to the actuating limb 32, which is slidable in sleeve 21. By means of this U-shaped form, a guiding connection is afforded that will prevent binding of the rod 25. Intermediate stop portions 34 and 35 of said rod are bent inwardly, as clearly shown in Fig. 4, and are adapted to engage the stops ends 23 and 24, respectively, to limit movement of said rod toward a throttle closing position. The remainder of the bight of said rod, which spans the heel guide channel A, extends forwardly, as indicated at 36 and 37 and thence across the channel A, as indicated at 38. This bight portion is an actuating portion for the rod which is located in the rear of and is adapted to be actuated by the rear of the heel of the driver's foot when the latter is bodily retracted rearwardly, as will presently appear. I prefer to provide an anti-friction element on portion 38, in the form of a roller sleeve 39, which is free to turn and thereby avoid wearing the heel of the driver's shoe.

Referring now more particularly to the operation of the invention, it will be clear, as shown in Fig. 1, that the heel of the driver's foot is in channel A with the toe portion of the foot on the brake plate 14, ready to operate the brake. When the driver desires to open the throttle of the carbureter, he does not have to take his foot off from the brake plate 14, he merely shifts his foot rearwardly, the toe sliding on the brake plate 14, as shown in Fig. 3, and in this rearward movement, the driver will have actuated the accelerator device by reason of the fact that the rear of his heel will have shifted the roller or sleeve 39, backwardly. This backward movement is against the action of the throttle restoring spring 28, which normally acts to advance the rod 25 into a position to close the throttle. When the driver wishes to apply the brake, he merely presses his toe on plate 14, as shown in Fig. 2.

It will thus be seen that to apply the brake or open the throttle, all the driver has to do is to slide his foot either forwardly or backwardly to a very slight extent, and his foot is always held or guided to register with either the brake plate 14 or the sleeve 39. Thus it will be clear, that with my invention, the shifting of the foot forwardly or backwardly, can be accomplished much more quickly than it could if it were necessary to shift the foot laterally, in which latter event, the foot could not be guided into registry with the brake or accelerator.

Ordinarily, it requires a second of time to shift the foot laterally from the throttle to the brake lever or treadle. In this time, with the car running thirty miles per hour, the car would advance forty four feet before the foot could be shifted from the throttle to the brake treadle.

With my invention, no time is lost in shifting the foot as it will be clear that the toe of the foot need not even be removed from the brake treadle while the heel is shifted forwardly or rearwardly in channel A, as shown in Figs. 1, 2 and 3. Thus, in an emergency, I can apply the brake instantly.

Further, with my improved guide channel, there will be no objectionable jerking of the car, as now results when it is traversing rough roads as the heel of the foot is engaged in the guide while the toe of the foot is engaged on the plate 14, thereby insuring a more uniform gas feed.

While I have herein shown one specific form of my invention, I do not wish to be limited thereto except for such limitations as the claims may import.

I claim:

1. In a foot controlled accelerator mechanism for automobiles, the combination of a treadle lever adapted to swing in a given plane through the inclined toe board of the automobile, of an elongated heel guide mounted on the horizontal foot board rearwardly of and in the swinging plane of said treadle lever, said heel guide having laterally disposed guide sleeves, a U-shaped rod having its bight spanning said heel guide between said sleeves and projecting forwardly in said heel guide, from the rear ends of said sleeves and being provided with an anti-friction roller for engagement by the rear of the operator's heel, said bight engaging the rear ends of said sleeves to arrest said rod against forward movement beyond a throttle closing position, said U-shaped rod having an idle guide limb slidable in one of said sleeves and a throttle opening limb slidable in the other of said sleeves, and a spring normally acting to dispose said rod in a throttle closing position and with bight portions of said rod in engagement with the rear ends of said sleeves, whereby the operator may slide his foot rearwardly on said treadle to engage his heel with said roller and open the throttle or forwardly to release and close said throttle and actuate said treadle.

2. In a foot controlled accelerator mechanism for automobiles, the combination with a treadle lever adapted to swing in a given plane, of an elongated heel guide mounted rearwardly of and in the swinging plane of said treadle lever, said heel guide having laterally disposed guide-ways, a U-shaped rod having its bight spanning said heel guide for actuating engagement by the rear of the operator's heel and said bight being adapted for engagement with the rear ends of said guide-ways to arrest said rod against forward movement beyond a throttle closing position, said U-shaped rod having an idle limb slidable in one of said guide-ways and a throttle opening limb slidable in the other of said guide-ways, and a spring normally acting to dispose said rod in a throttle closing position with the bight in engagement with the rear ends of said guide-ways, whereby the operator may slide his foot rearwardly in said heel guide to engage said bight and open the throttle or forwardly in said heel guide to permit closing of the throttle and engage said treadle.

3. In a foot controlled accelerator mechanism for automobiles, the combination with a treadle lever adapted to swing in a given plane, of an elongated heel guide mounted rearwardly of and in the swinging plane of said treadle lever, a throttle opening rod slidable in said heel guide and having an actuating position disposed across said heel guide for actuation by the rear of the heel of the operator's foot and said rod having operative connection with the throttle of the carbureter, and a spring normally acting to dispose said rod in a throttle closing position, whereby the operator's foot may be advanced or retracted in a given plane to alternately operate said rod or treadle lever.

4. In a foot controlled accelerator mechanism for automobiles, the combination with a treadle lever adapted to swing in a given plane and be swung forwardly by the toe of the driver's shoe to function, an elongated heel guide disposed in the swinging plane of said treadle lever and extending rearwardly therefrom, and a throttle actuating member slidable in said heel guide and having a portion disposed in the swinging plane of said treadle lever and adapted to be actuated by the heel of the driver's foot as the latter is retracted in the plane of the treadle lever to release the latter.

5. In a foot controlled accelerator mechanism for automobiles, the combination with a treadle lever adapted to swing in a given plane and forwardly by the toe of the driver's heel to function, and an accelerator device having a throttle actuating member back of the driver's foot and movable in the plane of said lever and in the path of retraction of the driver's foot for actuation by retraction rearwardly of the latter to open the throttle or releasable and movable in the plane of said lever as the driver's foot is advanced.

6. In a foot controlled accelerator mechanism for automobiles, the combination with a treadle lever adapted to swing in a given plane and forwardly by the toe of the driver's foot to function, and an accelerator device having a reciprocating throttle actuating member back of the driver's foot and movable in the plane of said lever and in the path of retraction of the driver's foot for actuation by the latter to open said throttle or releasable and movable in the plane of said lever as the driver's foot is advanced.

7. In a foot controlled accelerator mechanism for automobiles, the combination with a treadle brake lever movable in a given plane, an accelerator device having a throttle actuating member in the rear of the driver's foot and movable in the plane of said lever and in the path of retraction of the driver's foot for actuation by the latter to open the throttle or to release said member for closure of the throttle on advancing movement of the driver's foot, and elongated means for slidably guiding the driver's foot during movement of said member.

8. In a foot controlled accelerator mechanism for automobiles, the combination with a treadle brake lever movable in a given plane, an accelerator device having a reciprocating throttle actuating member in the rear of the driver's foot and movable in the plane of said lever and in the path of movement of the driver's foot when the latter is being retracted rearwardly, and means for guiding the heel of the driver's foot.

9. In an accelerator mechanism, a throttle actuating member disposed rearwardly of the driver's foot and being movable in the plane of a brake lever for actuating by the driver's foot and rearward retraction of the latter from said lever.

In witness whereof, I have hereunto set my hand.

JOHN LINDER.